(12) United States Patent
Nair et al.

(10) Patent No.: US 10,091,832 B2
(45) Date of Patent: Oct. 2, 2018

(54) CALL FAILURE REDUCTION

(71) Applicant: Affirmed Networks, Inc., Acton, MA (US)

(72) Inventors: Girish Nair, Nashua, NH (US);
Srinivas Kappla, Nashua, NH (US)

(73) Assignee: AFFIRMED NETWORKS, INC., Acton, MA (US)

( * ) Notice: Subject to any disclaimer, the term of this patent is extended or adjusted under 35 U.S.C. 154(b) by 101 days.

(21) Appl. No.: 14/943,710

(22) Filed: Nov. 17, 2015

(65) Prior Publication Data

US 2017/0142773 A1    May 18, 2017

(51) Int. Cl.
*H04W 4/00* (2018.01)
*H04W 76/18* (2018.01)
*H04W 76/02* (2009.01)
*H04W 88/16* (2009.01)

(52) U.S. Cl.
CPC ......... *H04W 76/18* (2018.02); *H04W 76/027* (2013.01); *H04W 88/16* (2013.01)

(58) Field of Classification Search
CPC .................................................. H04W 76/20
USPC ....................................................... 370/329
See application file for complete search history.

(56) References Cited

U.S. PATENT DOCUMENTS

| | | | |
|---|---|---|---|
| 2012/0236709 A1 | 9/2012 | Ramachandran et al. | |
| 2013/0007286 A1 | 1/2013 | Mehta et al. | |
| 2015/0124585 A1 | 5/2015 | Sahin et al. | |
| 2015/0347017 A1* | 12/2015 | Shacham ................ | G06F 3/061 |
| | | | 711/103 |

FOREIGN PATENT DOCUMENTS

| | | | |
|---|---|---|---|
| EP | 2747364 A1 | 6/2014 | |
| WO | WO-2014175811 A1 | 10/2014 | |

OTHER PUBLICATIONS

International Search Report and Written Opinion issued by the U.S. Patent and Trademark Office as International Searching Authority, for International Application No. PCT/US16/62186, dated Feb. 3, 2017 (9 pages).

* cited by examiner

*Primary Examiner* — Dang Ton
(74) *Attorney, Agent, or Firm* — Wilmer Cutler Pickering Hale and Dorr LLP

(57) ABSTRACT

Systems and methods of directing a mobile user to a redirect server when the mobile user experiences session startup failure thereby reducing repeated attempts to establish a session during session startup failure. A first request is received in packet gateway to create a mobile session in a mobile network for a mobile device. A second request is transmitted to a server, the second request associated with an inquiry regarding a status of the mobile device. A call failure indication is received from the server for the mobile device. An indication of call success is transmitted to a serving gateway, and a redirect session is created such that the mobile device is directed to a redirect sever during the redirect session, thereby reducing repeated attempts to establish a session during session startup failure.

24 Claims, 6 Drawing Sheets

US 10,091,832 B2

CALL FAILURE REDUCTION

TECHNICAL FIELD

Embodiments of the present invention generally relate to computerized methods and apparatus for call failure reduction.

BACKGROUND

In a mobile network, repeated session setups can occur when a session setup fails and a subscriber re-attempts a session. Repeated reattempts by network subscribers can potentially result in a loop of tens of hundreds of session setup failures for each subscriber. Session setup failures waste resources in Packet Gateway (PGW)/Gateway General Packet Radio Service (GPRS) Support Node (GGSN), as well as in the RAN and other external nodes.

SUMMARY OF THE INVENTION

Systems and methods are disclosed for directing a mobile user to a redirect server when the mobile user experiences session startup failure thereby reducing repeated attempts to establish a session during session startup failure. In some embodiments, the systems and methods include receiving, by a computing device in a packet gateway (PGW), a first request to create a mobile session in a mobile network for a mobile device, transmitting, by the computing device, a second request to a server, the second request associated with an inquiry regarding a status of the mobile device, receiving, by the computing device, a call failure indication from the server for the mobile device, transmitting, by the computing device, an indication of call success to a serving gateway (SGW), and creating, by the computing device, a redirect session such that the mobile device is directed to a redirect sever during the redirect session, thereby reducing repeated attempts to establish a session during session startup failure.

In some embodiments, the first request comprises a create session request, the create session request including creating a General Packet Radio Service (GPRS) Tunneling Protocol (GTP) Tunnel between a multimedia messaging service (MME) and the SGW. In some embodiments, the second request comprises a Credit-Control-Request (CCR). In some embodiments, the call failure indication comprises a Credit-Control-Accept (CCA). In some embodiments, the redirect server includes information associated with restoring service for the mobile user. In some embodiments, the call failure indication is associated with at least one of call failure due to misconfiguration, call failure due to a non-responsive remote peer node and call failure due to a downed interface. In some embodiments, the systems and methods disclosed herein further include closing, by the computing device, the redirect session, wherein the method of closing the redirect session includes determining, by the computing device, a number of sessions closed within a first time period, and closing, by the computing device, the redirect session when a timer associated with a second time period expires and the number of sessions closed within the first time period do not exceed a threshold number of closed sessions. In some embodiments, the systems and methods disclosed herein further include restarting a timer associated with the second period of time when the number of sessions closed within the first time period exceeds the threshold number of closed sessions.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
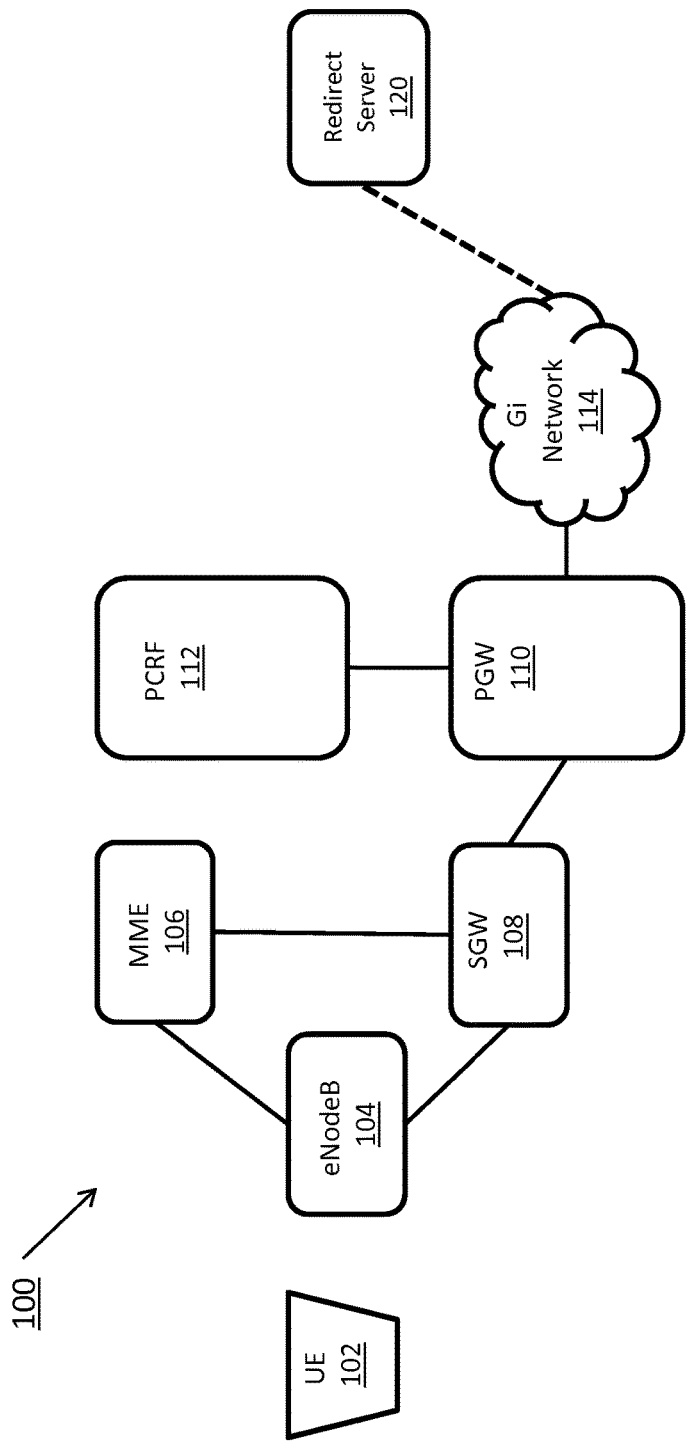
FIG. 1 is a system diagram showing the networked system 100, according to some embodiments.

Call failure is an issue that can happen in the PGW for multiple reasons. The techniques described herein provide a generic solution to all sources and reasons for call failure. The techniques described herein provide a default behavior for redirection for a host of external interface error cases including those with PCRF, RADIUS server, GTPP server and others.

Some embodiments of the present disclosure address reducing Call Failures for subscribers who are either (1) rogue (rogue subscribers include subscribers who have not subscribed to a service from the service provider or subscribers whose subscription have expired) or (2) have repeated failures due to transient misconfiguration issues or (3) in the case of a catastrophic external node failure. Transient misconfiguration can be in any of Remote Authentication Dial In User Service (RADIUS)/Online Charging System (OCS)/Offline Charging System OFCS/General Packet Radio Service Tunneling Protocol Prime (GTPP)/Policy and Charging Rules Function (PCRF) servers. In some embodiments of the present disclosure, a PCRF server call flow is described in more detail. A PCRF server call flow can be representative of failures that can happen with any other server. For example, an OCS Server can send a failure response if a session is not found or the response from an OCS server can time out on the PGW either because the OCS server itself is down or because the link to the OCS server is down. In some embodiments, repeated subscriber failures are tracked and special treatment is provided to such subscribers. The PGW optionally can track the identity of a subscriber that failed by recording the International Mobile Subscriber Identity (IMSI) and if repeated (more than one)

failures occur for the same subscriber, the special treatment can be provided. Special treatment can include putting the subscribers into an active redirect state (and not closed state) such that repeated failures are avoided. A successful response can be sent downstream such that the subscriber/ MS (Mobile Station) does not attempt the session setup again. In some embodiments, a configurable timer is started to flush the subscribers which are in the "redirect-state". Flushing a subscriber can include the PGW initiating a procedure to delete the subscriber's session and thus "flushing" the session from the PGW. This timer can have an optional adjustment for load rate, limiting the session closes occurring in a particular interval, which would also reduce the network load in case of catastrophic external node failures. For example, assume that a system can handle 100 subscriber flushes per second. For a particular subscriber the flush occurs after a period of time corresponding to a flush-subscriber-timer elapsing (e.g., 1 hour). After 1 hour is elapsed the system checks if the session can be deleted. If the redirect session close rate has exceeded 100 for that second, the session is kept in redirect state again and the timer is re-started. This can be repeated many times until the session close rate goes down and then when the timer expires, this session will be terminated. This is explained in more detail in FIG. 6.

In some embodiments, repeated failures for rogue subscribers are dramatically reduced resulting in improved failed called attempts statistics. For example, assume there are 100 subscribers and 1 subscriber is improperly configured on a PCRF server. 99 sessions will come up and 1 session will fail. Without the redirect feature, the 1 session is closed right away. The behavior of a typical UE is such that a new session setup is attempted right away or when the user attempts service again. When this happens, the PCRF will again reject the call and thus depending on the number of times this occurs the session setup failure occurs—it is not atypical for such a subscriber to try up to 10 times, and the failure rate is skewed from 1% to 10%.

Some embodiments of the present disclosure provide a buffer in a transient misconfiguration scenario against repeated session setup failures. Better odds of session setup succeeding are also provided than when repeating session setup attempts at a high rate.

Some embodiments provide, for catastrophic external node failure, a reduction in call setup failures. In some embodiments, subscriber flushing tied to rate limits can potentially save a network melt down. In some embodiments, a network melt down includes severe network dysfunction and network failure. For example, when an interface to a PCRF is down and all session setups fail in a system without call failure reduction functionality, all session setups are repeated by the UEs continuously (since session setups failed). Note that 1% UE setup failure can skew network failure rates to 10%, while 100% UE setup failure can skew network failure rates to 1000%, which is typically an unsustainably high call setup rate. As described above, it is not atypical for a subscriber to try up to 10 times and thus the failure rate is skewed from 1% to 10%. Extending this to 100% failure, and each subscriber again tries on average 10 times, the failure rates could go up to 1000%. This unsustainable call setup rate can in turn trigger more network dysfunction, such as exposing an external server to much higher transaction rates than designed, which can result in further network element dysfunction like sluggish response or time out or an outright interface down situation. The chain reaction of network element dysfunction in a downward spiral is referred to as a network meltdown.

FIG. 1 is a system diagram showing the networked system 100, according to some embodiments. System 100 includes user equipment (UE) 102, evolved node B (eNodeB) 104, multimedia messaging service (MME) 106, serving gateway (SGW) module 108, packet data network gateway (PGW) 110, policy and charging rules function (PCRF) 112, Gi network 114, and redirect site 120.

UE 102 connects to the networked system 100 through eNodeB 104. UE 102 includes computing devices configured to connect to a mobile data network (e.g., mobile phones, tablets, laptops). eNodeB 104 is a radio part of a cell site. A single eNodeB 104 may contain several radio transmitters, receivers, control sections and power supplies. eNodeB 104 can be backhauled to MME 106 and SGW 108. Backhaul is a process of transferring packets or communication signals over relatively long distances to a separate location for processing. SGW 108 routes and forwards user data packets, while also acting as the mobility anchor for a user plane during inter-eNodeB handovers. MME 106 is a control node in the networked system 100. MME 106 handles the LTE related control plane signaling that also includes mobility and security functions for UE 102 that attaches to the LTE Radio network. MME 106 also handles UE being in idle mode, including support for Tracking area management and paging procedures.

PGW 110 (Packet Data Network Gateway) is the point of interconnect between the mobile network and the external IP networks and handles policy enforcement, IP Address allocation and charging functions. PCRF 112 (Policy and Charging Rules Function) interfaces with the PGW to provide PGW with the appropriate policies to enforce for each subscriber. Gi Network 114 is an Internet Protocol (IP) based network connecting the PGW with a packet data network or the Internet. The Redirect Server 120 is a web server where subscribers get redirected to if they do not have service either temporarily due to network outage or due to subscription lapse where they will get information on how to restore the service.

Figure 2:
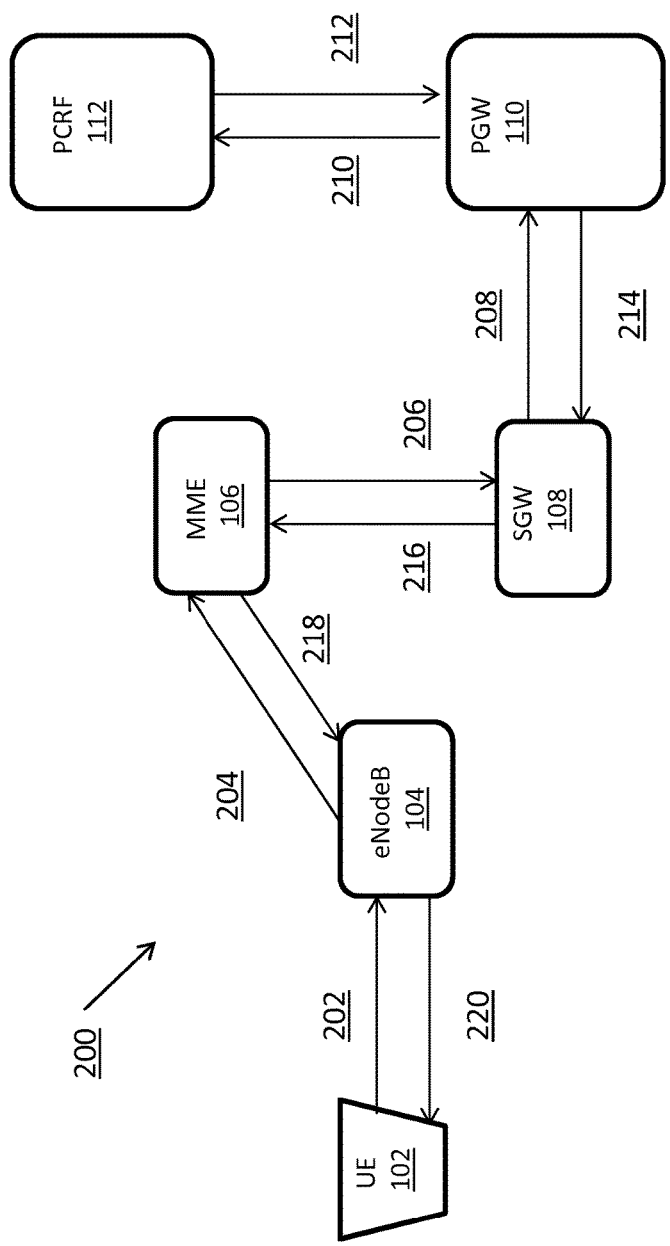
FIG. 2 is a diagram showing repeated session startups when a session startup fails.

FIG. 2 is a diagram 200 showing repeated session startups when session startup fails. FIG. 2 shows UE 102, PGW 110, and PCRF 112. FIG. 2 also shows UE sending a request to eNodeB 102 which in turn, forwards the request 204 to MME 106. MME 106 forwards the request 206 to SGW 108 which in turn forwards it 208 to PGW 110. PGW 110, in the process of setting the session up, queries PCRF 112 for the policy 210. PCRF 112 sends back an unknown subscriber error back to PGW 110 in 212. PGW 110 sends a Create Session Response Failure back to SGW in 214 which in turn forwards the failure in 216 to MME which in turn forwards it 218 to eNodeB 104. eNodeB 104 forwards the failure 220 to UE 102. UE 102 receives the failure indication and so it will have no session to access the network. When the subscriber tries to access the service again the whole sequence from 202 to 220 repeats. This usually occurs multiple times until the subscriber gives up.

Referring to step 202 to 220, repeated session startups can occur multiple times for each subscriber who does not have service or if the subscriber is wrongly configured on PCRF 112 or if the link from PCRF 112 to PGW 110 or PGW 110 to PCRF 112 is down or if PCRF 112 is down and not functioning while the session setup is happening. A similar sequence can also occur if PGW 110 cannot authorize the user in the RADIUS server. The RADIUS server is another interface that PGW 110 can optionally query to authorize the subscriber. Similar issues can happen in PGW 110 to RADIUS interface as well. Repeated session startups can occur multiple times also for a subscriber who does not have service or a subscriber who is wrongly configured on the RADIUS server or if the link from PCRF to RADIUS server or PGW to RADIUS server is down or if the RADIUS server is down and not functioning while the session setup is happening. Similarly PGW 110 can be configured to send Accounting Records for a subscriber to a GTPP server. If the GTPP server is down or if the link is down to the GTPP server again the PGW could close the session typically and a similar session setup loop can Occur.

Figure 3:
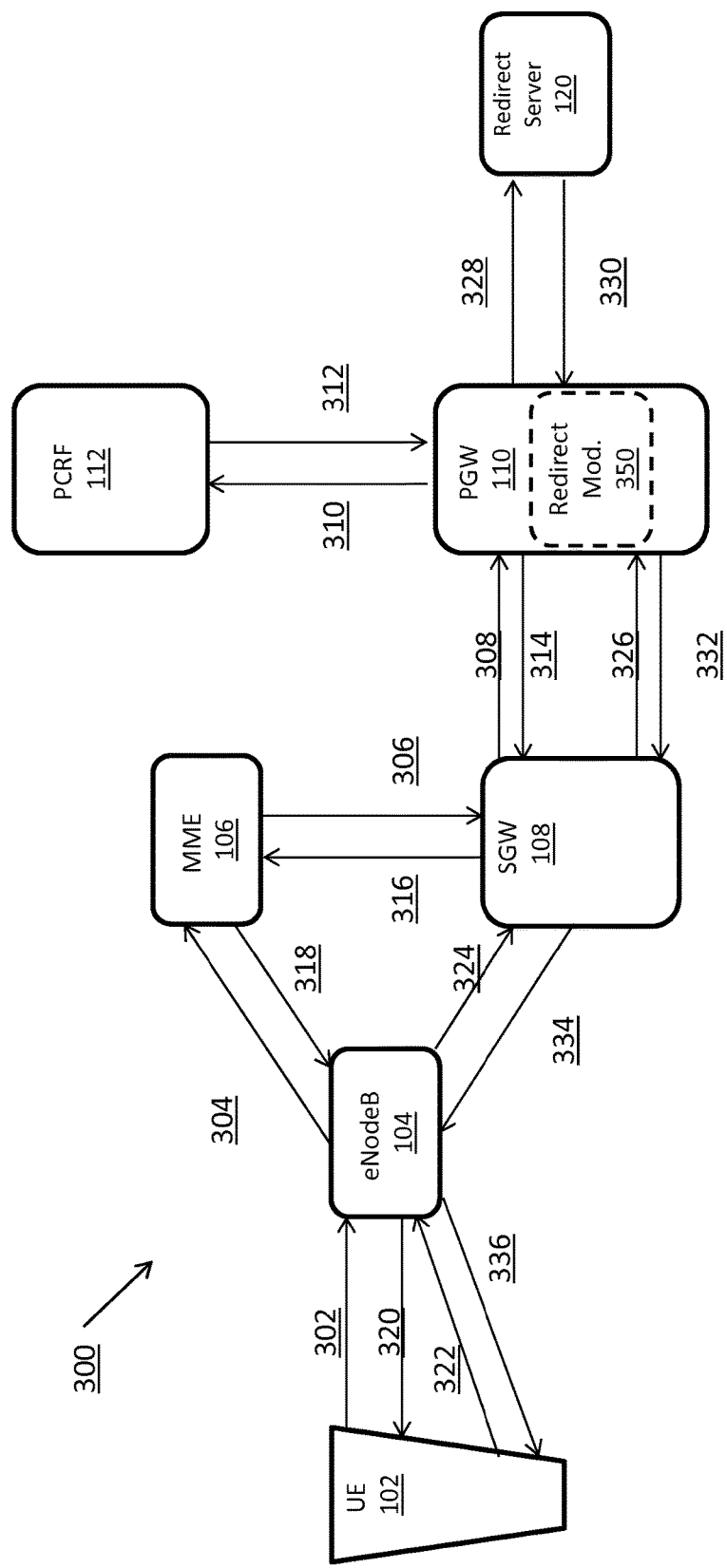
FIG. 3 is a diagram 300 showing redirection of a session startup request to a redirect site, according to some embodiments of the present disclosure.

FIG. 3 is a diagram 300 showing redirection of a session startup request to a redirect site, according to some embodiments of the present disclosure. FIG. 3 shows User Equipment (UE) 102, Evolved Node B (eNodeB) 104, Mobility Management Entity (MME) 106, Serving Gateway (SGW) 108, Packet Data Network Gateway (PGW) 110, Policy and Charging Rules Function (PCRF) 112, Redirect Server 120 and redirect module 350.

Steps 302-310 are similar to steps 202-210 described above in FIG. 2. Referring to step 312, when PCRF sends failure response in 312 to PGW 110, PGW 110 uses a Re-direct Module 350 to redirect the user to re-direct server 120 instead of closing the session. Instead of sending a failure response back to SGW 108 as in 214 in FIG. 2, a success response is sent to SGW 108 in 314. SGW 108 forwards this response to MME 106 in 316, which in turn sends a success response to eNodeB 104 in 318. eNodeB 104 sends a success response to UE 102 in 320. Now UE 102 has a session to communicate with the network. When the user tries to access the network, UE 102 sends a data packet to the eNodeB 104 in 322 which forwards the user data packet to SGW 108 in 324 which in turn forwards the data packet in 326 to PGW 110. Redirect module 350 intercepts the packet and redirects it to the redirect-server in 328. The re-direct server will have the appropriate error message (e.g., an option to restore the service or notice that there is an outage at that period of time). This response is sent in 330 back to PGW 110, which in turn forwards it to SGW 108 in 332. SGW 108 forwards this back to eNodeB 104 in 334 which in turn sends it to the UE 102 in 336.

Figure 4:
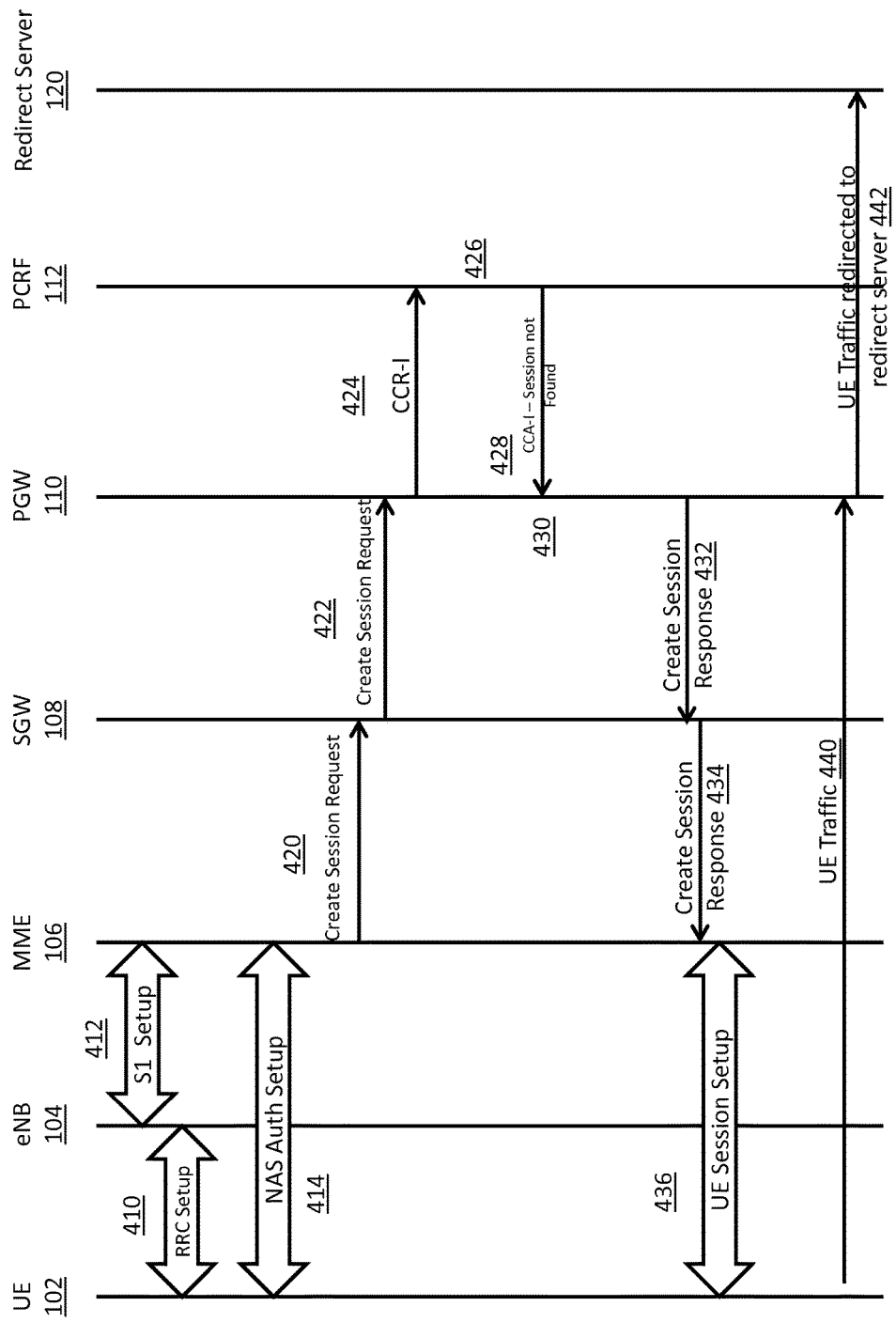
FIG. 4 is a diagram illustrating redirection of UE traffic to a redirect server when there is call failure due to misconfiguration, according to some embodiments of the present disclosure.

FIG. 4 is a diagram illustrating redirection of UE traffic to a redirect server when there is call failure due to misconfiguration, according to some embodiments of the present disclosure. FIG. 4 shows User Equipment (UE) 102, Evolved Node B (eNodeB) 104, Mobility Management Entity (MME) 106, Serving Gateway (SGW) 108, Packet Data Network Gateway (PGW) 110, Policy and Charging Rules Function (PCRF) 112, Redirect Server 120.

Steps 410, 412 and 414 show UE session being setup 436 on MME 106 and eNodeB 104. Briefly, RRC Setup 410 involves setting up Radio bearers between UE and the eNodeB. 51 setup 412 involves setting up the 51 interface which connects the eNodeB to the MME, and NAS Authorization 414 involves mutual authentication between UE and MME as well as integrity and ciphering setup between UE and MME.

Referring to step 420, MME 106 sends a Create Session Request to SGW 108. A Create Session Request includes initiation of the creation of the GTP (GPRS Tunneling Protocol) Tunnel between MME and the SGW. SGW forwards Create Session Request to PGW 110 in step 422.

Referring to step 424, PGW 110 sends a Credit-Control-Request Initial (CCR-I) to PCRF. A CCR-I is the Initial Credit Control Request which has the details of the UE and other detailed information included in the request to the server to allocate a policy to the UE. For the scenario where there is a misconfiguration issue with this subscriber, the subscriber session may not be found in the PCRF 112 426, and PCRF 112 sends a Credit-Control-Accept-Initial (CCA-I) with an error "Session not found" as in Step 428. This invokes the Re-direct Module in PGW 110 and instead of closing the session, the UE session is placed in re-direction mode 430. In some embodiments, a session close timer is started as well. Instead of sending a failure response back to SGW 108, a success response is sent to SGW 108 in 432. SGW 108 forwards this response to MME 106 in 434, which in turn sends a success response to eNodeB 104 and a successful UE session is created as shown in 436. As a result, UE 102 has a session to communicate with the network. When the user tries to access the network, UE 102 sends a data packet to the eNodeB 104, which in turn forwards it to the SGW 108, which forwards the packet to the PGW 110 as shown in 440. PGW redirect module 350 (not shown) intercepts the packet and redirects it to the redirect-server in 442. Re-direct server 120 can send an appropriate error message, which can include information about restoring the service or notice that there is an outage at that period of time as appropriate.

Referring to 428, since the redirect module in PGW 110 does not close the session, it avoids the continuous loop of session setup attempt from UE 102 followed by a failure indication to UE 102. This is because from the MME and from the UE perspective, the session is still alive. But when the user tries to access traffic, the user is notified of the error scenario in the network. The session close timer can close the session, upon which the UE will attempt a new session. If the network anomaly has been corrected, the user will get normal service, else the UE will again be put in the re-direct mode. This can reduce the network control plane usage several fold in error conditions.

Figure 5:
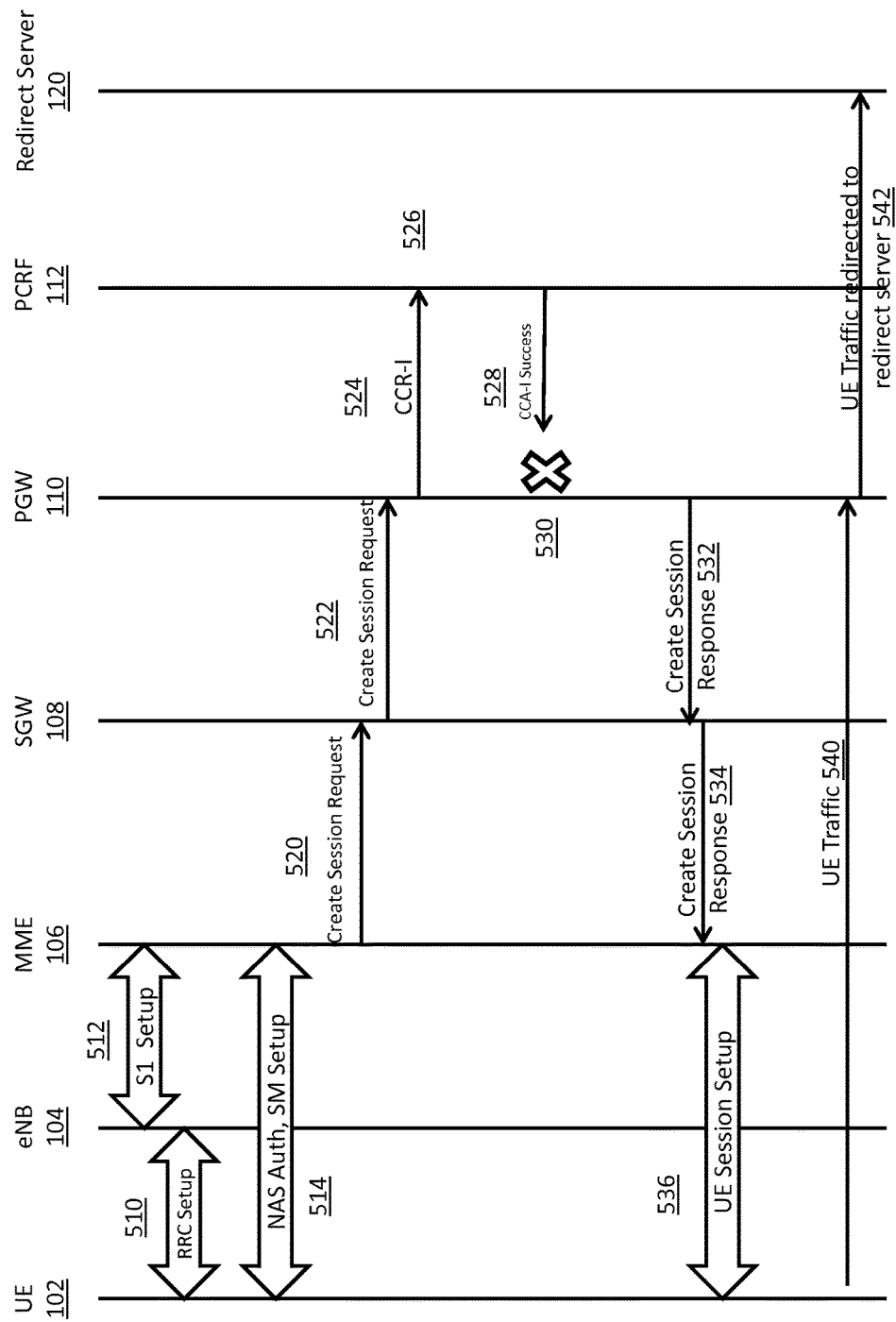
FIG. 5 is a diagram illustrating redirection of UE traffic to a redirect server when there is call failure due to a non-responsive remote peer node or a downed interface, according to some embodiments of the present disclosure.

FIG. 5 is a diagram illustrating redirection of UE traffic to a redirect server when there is call failure due to a non-responsive remote peer node or a downed interface, according to some embodiments of the present disclosure. FIG. 5 shows User Equipment (UE) 102, Evolved Node B (eNodeB) 104, Mobility Management Entity (MME) 106, Serving Gateway (SGW) 108, Packet Data Network Gateway (PGW) 110, Policy and Charging Rules Function (PCRF) 112, Redirect Server 120. Steps 510, 512 and 514 show the UE session being setup on the MME and eNodeB. This results in MME 106 sending a Create Session Request 520 to SGW 108, which in turns forwards the Create Session Request to the PGW 522. PGW 110 sends a Credit-Control-Request Initial (CCR-I) to the PCRF 112 524. Steps 510-524 are similar to steps 410-424, as described above. FIG. 5 shows another error scenario which is possible for embodiments of the invention. In this case, PCRF 112 is down or the link to PCRF 112 or from the PCRF 112 is down 526. This results in the successful CCA-I not reaching PGW 110 528, which results in a response timeout at PGW 110 530. This invokes the Re-direct Module in PGW 110 and instead of closing the session, the UE session is placed in re-direction mode. In some embodiments, a session close timer is started as well. Instead of sending a failure response back to SGW 108, a success response is sent to SGW 108 in 532. SGW 108 forwards this response to MME 106 in 534, which in turn sends a success response to eNodeB 104 and a successful UE session is created as in 536. Now UE 102 has a session to communicate with the network. When the user tries to access the network, UE 102 sends a data packet to eNodeB 104, which in turn forwards it to SGW 108 which forwards the packet to PGW 110 as shown in 540. PGW redirect module 350 (not shown) intercepts the packet and redirects it to the redirect-server 120 in 542. Re-direct server 120 can send an appropriate error message, which can include information about restoring the service or notice that there is an outage at that period of time as appropriate.

Referring to 528, since the redirect module in PGW 110 does not close the session, it avoids the continuous loop of session setup attempt from UE 102 followed by a failure indication to UE 102. This is because from the MME and from the UE perspective, the session is still alive. But when the user tries to access traffic, the user is notified of the error scenario in the network. The session close timer will finally close the session, upon which the UE will attempt a new session. If the network anomaly has been corrected, the user will get normal service, else the UE will again be put in the re-direct mode. This can reduce the network control plane usage several fold in error conditions.

Figure 6:
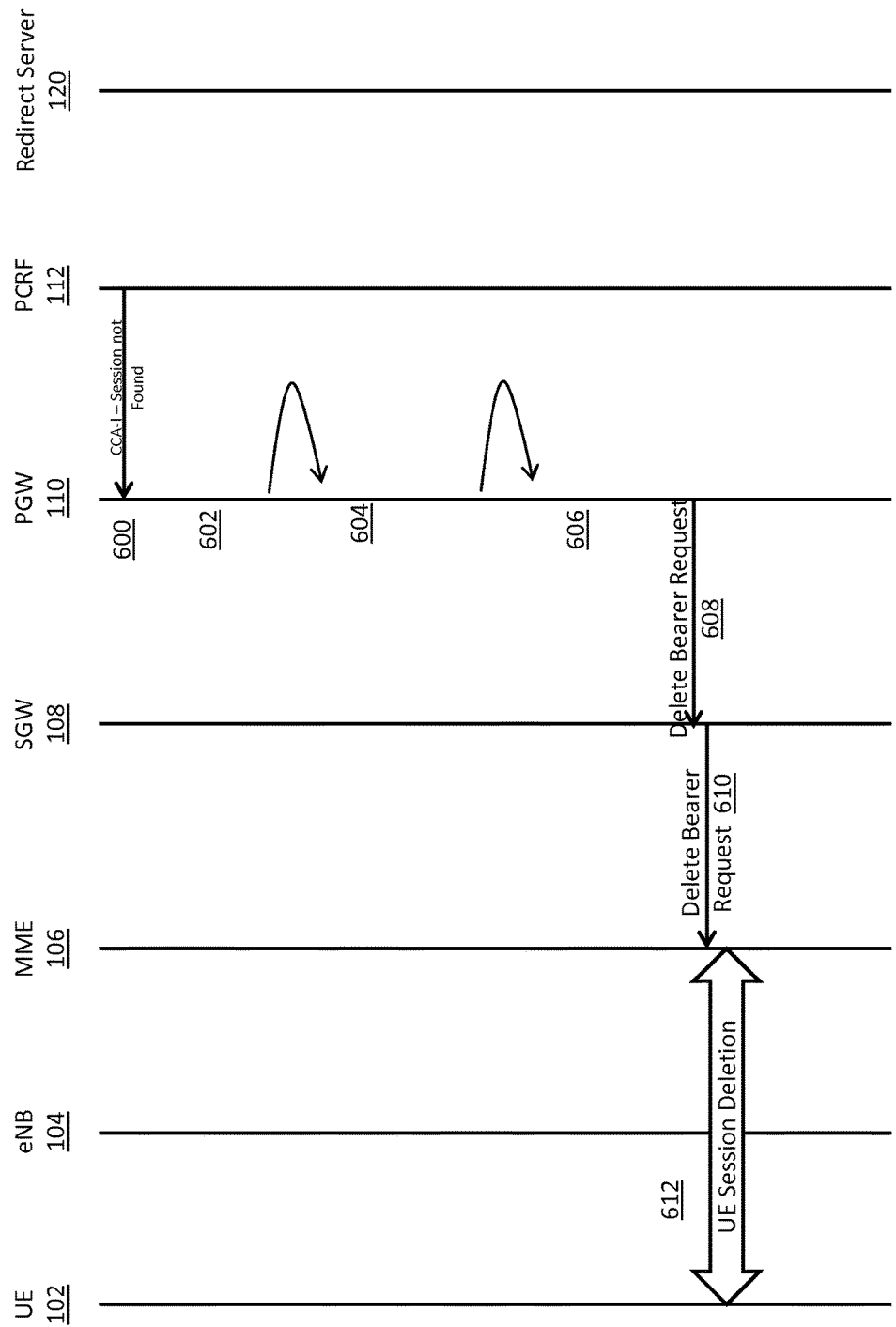
FIG. 6 is a diagram illustrating closing a re-direct session after expiry of a timer, according to some embodiments of the present disclosure.

FIG. 6 is a diagram illustrating closing a re-direct session after expiry of a timer, according to some embodiments of the present disclosure. FIG. 6 shows User Equipment (UE) 102, Evolved Node B (eNodeB) 104, Mobility Management Entity (MME) 106, Serving Gateway (SGW) 108, Packet Data Network Gateway (PGW) 110, Policy and Charging Rules Function (PCRF) 112, Redirect Server 120. Step 600 shows PCRF 112 sending an error message in Credit-Control-Accept-Initial (CCA-I). This is similar to steps 410-428 in FIG. 4. PCRF 112 sending an error message invokes the Re-direct Module in the PGW 110 and instead of closing the session, the UE session is placed in re-direction mode. At the same time, a long duration session close timer is started (e.g., 1 hour). This means that the session will be put in re-direction mode up to 1 hour and after that a session close will be attempted as shown in step 602. After the session close timer has elapsed, an attempt can be made to close the redirect session. However if the current redirect session close rate limit has been exceeded, the session close timer is restarted again, as shown in 604. This rate limiting ensures that only a certain percentage of the PGW and RAN resources are used to clean up redirected sessions. This also automatically restores the network after an outage without overloading the system. After another hour has elapsed, another attempt is made to close the redirect session. This time if the current redirect session close rate limit has not been exceeded, the session is closed 606. A Delete Bearer Request 608 is sent to the SGW which in turn sends a Delete Bearer Request to the MME 610. The UE session is then deleted on the eNodeB and the UE is notified 612. If the user needs to access the service, the session is restarted again at this time.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method of directing a mobile user to a redirect server when a mobile user session experiences session startup failure thereby reducing repeated attempts to establish a session during session startup failure, the computerized method comprising:
    receiving, by a computing device in a packet gateway (PGW), a first request to create a mobile session in a mobile network for a mobile device;
    transmitting, by the computing device, a second request to a server, the second request associated with an inquiry regarding a status of the mobile device;
    receiving, by the computing device, a call failure indication from the server for the mobile device;
    transmitting, by the computing device, an indication of call success to a serving gateway (SGW);
    creating, by the computing device, a redirect session such that the mobile device is directed to a redirect server during the redirect session; and
    closing, by the computing device, the redirect session, the method of closing the redirect session comprising:
        determining, by the computing device, a number of sessions closed within a first time period; and
        closing, by the computing device, the redirect session when a timer associated with a second time period expires and the number of sessions closed within the first time period do not exceed a threshold number of closed sessions;
    thereby reducing repeated attempts to establish a session during session startup failure.

2. The computerized method of claim 1, wherein the threshold comprises 100 sessions and the first time period comprises 1 second.

3. The computerized method of claim 1, further comprising restarting a timer associated with the second period of time when the number of sessions closed within the first time period exceeds the threshold number of closed sessions.

4. A system for directing a mobile user to a redirect server when a mobile user session experiences session startup failure thereby reducing repeated attempts to establish a session during session startup failure, the system comprising:
    a processor;
    memory coupled to the processor and including computer-readable instructions that, when executed by a processor, cause the processor to:
        receive a first request to create a mobile session in a mobile network for a mobile device;
        transmit a second request to a server, the second request associated with an inquiry regarding a status of the mobile device;
        receive a call failure indication from the server for the mobile device;
        transmit an indication of call success to a serving gateway (SGW);
        create a redirect session such that the mobile device is directed to a redirect server during the redirect session; and
        close the redirect session, further wherein closing the redirect session comprises:
            determining a number of sessions closed within a first time period; and
            closing the redirect session when a timer associated with a second time period expires and the number of sessions closed within the first time period do not exceed a threshold number of closed sessions,
    thereby reducing repeated attempts to establish a session during session startup failure.

5. The system of claim 4, wherein the threshold comprises 100 sessions and the first time period comprises 1 second.

6. The system of claim 4, wherein the processor is further caused to restart a timer associated with the second period of time when the number of sessions closed within the first time period exceeds the threshold number of closed sessions.

7. A non-transitory computer readable medium having executable instructions operable to cause an apparatus to:
    receive a first request to create a mobile session in a mobile network for a mobile device;
    transmit a second request to a server, the second request associated with an inquiry regarding a status of the mobile device;
    receive a call failure indication from the server for the mobile device;
    transmit an indication of call success to a serving gateway (SGW);
    create a redirect session such that the mobile device is directed to a redirect server during the redirect session; and
    close the redirect session, further wherein closing the redirect session comprises:
        determining a number of sessions closed within a first time period; and
        closing the redirect session when a timer associated with a second time period expires and the number of sessions closed within the first time period do not exceed a threshold number of closed sessions,
    thereby reducing repeated attempts to establish a session during session startup failure.

8. The non-transitory computer readable medium of claim 7, wherein the threshold comprises 100 sessions and the first time period comprises 1 second.

9. The non-transitory computer readable medium of claim 7, wherein the apparatus is further caused to restart a timer associated with the second period of time when the number of sessions closed within the first time period exceeds the threshold number of closed sessions.

10. The computerized method of claim 1, wherein the first request comprises a create session request, the create session request including creating a General Packet Radio Service (GPRS) Tunneling Protocol (GTP) Tunnel between a multimedia messaging service (MME) and the SGW.

11. The computerized method of claim 1, wherein the second request comprises a Credit-Control-Request (CCR).

12. The computerized method of claim 1, wherein the call failure indication comprises a Credit-Control-Accept (CCA).

13. The computerized method of claim 1, wherein the redirect server includes information associated with restoring service for the mobile user.

14. The computerized method of claim 1, wherein the call failure indication is associated with at least one of call failure due to misconfiguration, call failure due to a non-responsive remote peer node and call failure due to a downed interface.

15. The system of claim 4, wherein the first request comprises a create session request, the create session request including creating a General Packet Radio Service (GPRS) Tunneling Protocol (GTP) Tunnel between a multimedia messaging service (MME) and the SGW.

16. The system of claim 4, wherein the second request comprises a Credit-Control-Request (CCR).

17. The system of claim 4, wherein the call failure indication comprises a Credit-Control-Accept (CCA).

18. The system of claim 4, wherein the redirect server includes information associated with restoring service for the mobile user.

19. The system of claim 4, wherein the call failure indication is associated with at least one of call failure due to misconfiguration, call failure due to a non-responsive remote peer node and call failure due to a downed interface.

20. The non-transitory computer readable medium of claim 7, wherein the first request comprises a create session request, the create session request including creating a General Packet Radio Service (GPRS) Tunneling Protocol (GTP) Tunnel between a multimedia messaging service (MME) and the SGW.

21. The non-transitory computer readable medium of claim 7, wherein the second request comprises a Credit-Control-Request (CCR).

22. The non-transitory computer readable medium of claim 7, wherein the call failure indication comprises a Credit-Control-Accept (CCA).

23. The non-transitory computer readable medium of claim 7, wherein the redirect server includes information associated with restoring service for the mobile user.

24. The non-transitory computer readable medium of claim 7, wherein the call failure indication is associated with at least one of call failure due to misconfiguration, call failure due to a non-responsive remote peer node and call failure due to a downed interface.

* * * * *